May 8, 1956 S. OFFERMAN 2,745,081

SOCKET FOR RADIO TUBES AND THE LIKE

Filed Jan. 30 1952 4 Sheets-Sheet 1

INVENTOR.
SEYMOUR OFFERMAN

BY James and Franklin
ATTORNEYS

SOCKET FOR RADIO TUBES AND THE LIKE

Filed Jan. 30 1952 4 Sheets-Sheet 2

INVENTOR.
SEYMOUR OFFERMAN
BY James and Franklin
ATTORNEYS

May 8, 1956 S. OFFERMAN 2,745,081

SOCKET FOR RADIO TUBES AND THE LIKE

Filed Jan. 30 1952 4 Sheets-Sheet 3

INVENTOR.
SEYMOUR OFFERMAN
BY James and Franklin
ATTORNEYS

May 8, 1956 S. OFFERMAN 2,745,081

SOCKET FOR RADIO TUBES AND THE LIKE

Filed Jan. 30 1952 4 Sheets-Sheet 4

INVENTOR.
SEYMOUR OFFERMAN
BY James and Franklin
ATTORNEYS

United States Patent Office 2,745,081 Patented May 8, 1956

2,745,081

SOCKET FOR RADIO TUBES AND THE LIKE

Seymour Offerman, Great Neck, N. Y., assignor to Industrial Hardware Mfg. Co., Inc., New York, N. Y., a corporation of New York Application January 30, 1952, Serial No. 269,005

12 Claims. (Cl. 339—194)

This invention relates to sockets to receive multiple pin connectors, typically the base of radio, television, or like tubes.

The primary object of the present invention is to generally improve tube sockets. The conventional socket comprises an insulation base with a ring of metal contacts, each contact including a pin gripping portion and a soldering lug to which circuit wires are first connected by bending and later by soldering. The attachment by bending and the soldering are painstaking and time-consuming tasks, even when put on an assembly line basis, and they represent a substantial factor in the cost of a radio or television receiver.

It has accordingly been proposed to provide each contact of a socket with a suitable clip or wire gripping portion, in lieu of the soldering lug conventionally employed. Thus the end of the wire to be connected may be simply pushed into the wire gripping portion, with considerable saving of time and effort. Moreover, by directing the wire gripping portions upward above the flat top face of the chassis, and by keeping the top of the chassis clear except for the wire gripping portions, it becomes possible to quickly and simultaneously solder all of the connections to all of the sockets of the chassis by so-called "pot soldering," that is, by arranging a dipping conveyor or other equipment to dip all of the wire grip portions (after the wire ends have been inserted therein) into a vat of flux, followed by a vat of molten solder.

I have discovered that considerable difficulty arises in attempting to practice this labor-saving process. Defective connections or open circuits have occurred, and I have found that the difficulty arises from the fact that in typical circuit arrangements it may be necessary to connect anywhere from one to four conductors to a single contact of the socket. Moreover, these conductors may vary in diameter over a considerable range of say 2:1, or typically from a diameter of 0.02" to 0.04". This may result in certain unique combinations of wires, in which one of the wires is not successfully gripped by the wire gripping portion of the contact, with the consequent possibility of escape prior to the soldering step.

The primary object of the present invention is to overcome the foregoing difficulty, and to provide a generally improved type socket which facilitates connection, and which insures an excellent grip on the wires over a range of from one to four wires and over a substantial range of wire diameter.

In the socket as so far described, the pin gripping portion of the contact may be conventional, but I have found that in sockets for miniature tubes having many pins, say seven, the spacing between the pin gripping portions of the contacts may become so small as to introduce the problem of possible electrical leakage therebetween. I have found that this problem is aggravated in the case of contacts in which the pin gripping portion is of the barrel type, by certain tabs or ears of metal which have been provided to support the free sides of the barrel against movement when subjected to the force of the tube pin. These tabs project sidewardly at the smallest diameter portion of the ring of contacts, and thus come closer to one another than the barrels or pin gripping portions themselves. A further object of the present invention is to overcome this difficulty, which is done by the provision of tabs made and located in a novel way which minimizes the possibility of electrical leakage between adjacent contacts.

A further object of the invention is to provide a tube pin gripping portion which is essentially of the simple pinch type and yet which is modified somewhat to provide a three-point contact on the tube pin.

To accomplish the foregoing general objects, and other more specific objects which will hereinafter appear, my invention resides in the tube socket elements, and in the metal contacts therefor, as are more particularly described in the following specification. The specification is accompanied by drawings in which the contacts and the sockets are for the most part shown in inverted position, because that is the wiring and soldering position. In practice the chassis, sockets and tubes may be used in any desired position, but for convenience and uniformity in language the verbal specification assumes that the normal position of the socket is one in which the tube is received vertically from above. The terms "upper lamination" and "lower lamination" are used in that sense.

With this understanding the drawings may be briefly described as follows.

Figure 4:
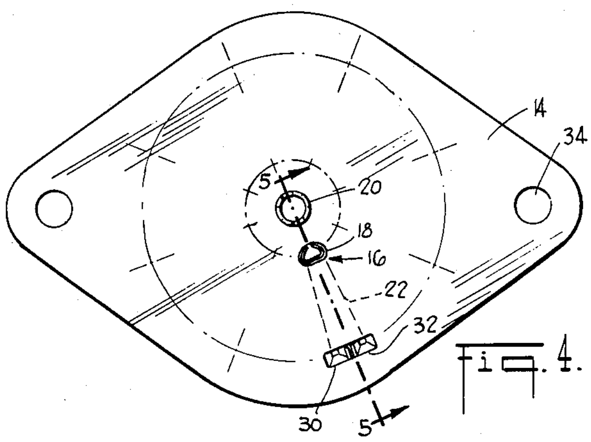
Fig. 4 is a plan view of a laminated tube socket in inverted position.
Figure 5:
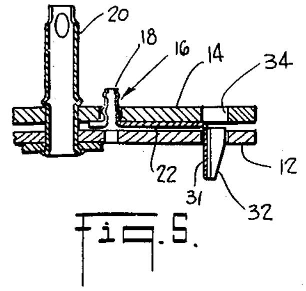
Fig. 5 is a section taken in the plane of the line 5—5 of Fig. 4.

Referring to the drawings, and more particularly to Figs. 4 and 5, I there show a laminated tube socket comprising an upper lamination of insulation material 12, and a lower lamination 14, between which metal contacts 16 are secured. These contacts are arranged in a ring, the pin gripping portions 18 thereof being disposed on a circle at the proper radius and spacing to receive the pins of the radio tube for which the socket is designed. In Fig. 4 only one contact is shown, but it will be understood that there are an appropriate number of contacts—in the present case seven contacts—disposed 45° apart, except for two disposed 90° apart in order to fix the orientation of the tube relative to the socket. If, as in the present case, the socket is provided with a center shield 20, the said shield may be employed as an eyelet to secure the two laminations 12 and 14 together.

Each contact comprises a flat metal base portion 22 which is located between the laminations 12 and 14. These base portions are preferably disposed radially, and the pin gripping portions 18 are preferably located at the inner ends of the base portions 22. The circuit wires are connected to the outer ends.

Figures 8, 9, 10, 11, 12, 13, 14, 15:
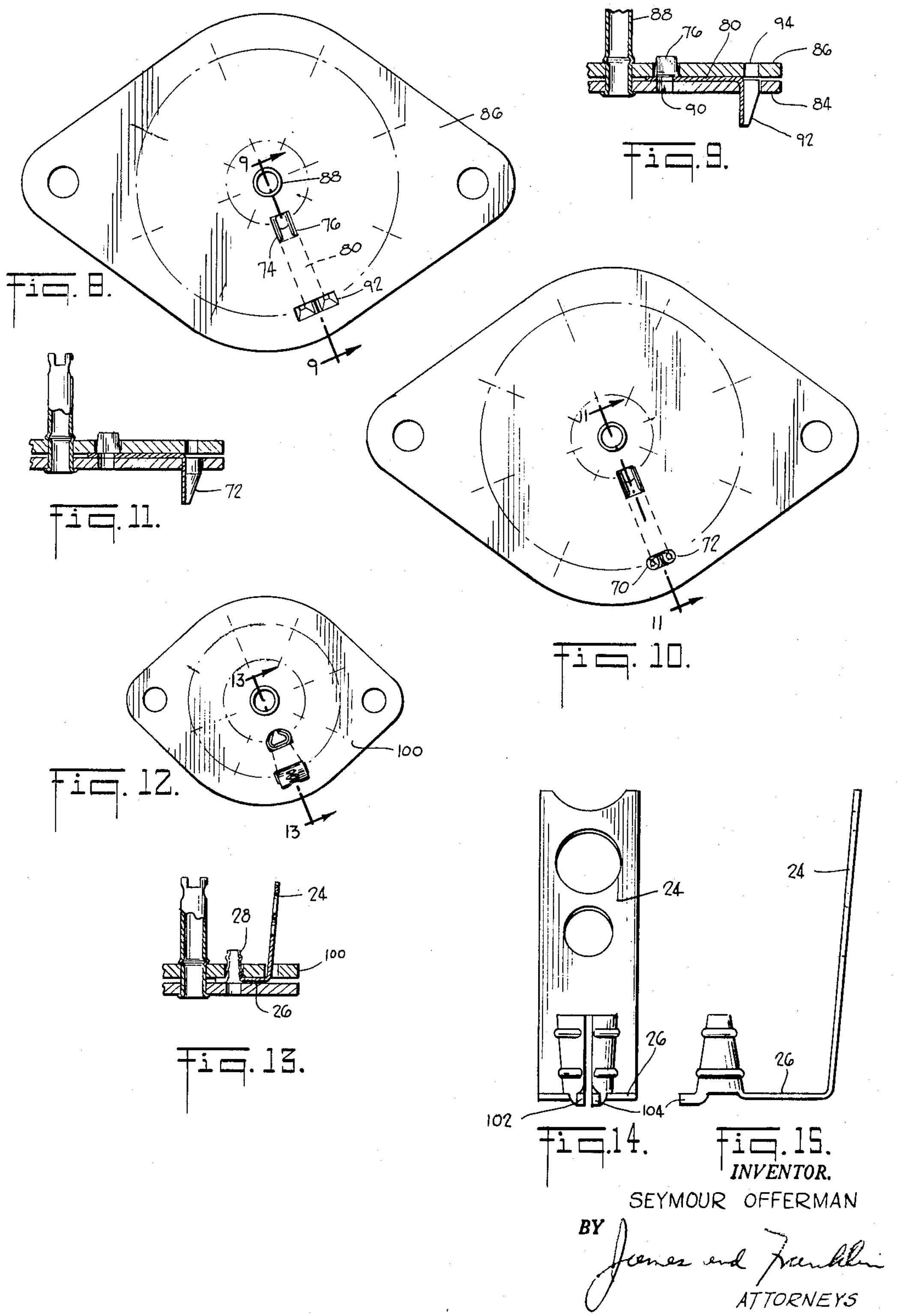
Fig. 8 is a plan view of an inverted socket utilizing the contacts of Fig. 6.
Fig. 9 is a section taken in the plane of the line 9—9 of Fig. 8.
Fig. 10 is a plan view of an inverted laminated socket utilizing the contacts shown in Fig. 7.
Fig. 11 is a section taken in the plane of the line 11—11 of Fig. 10.
Fig. 12 is a bottom view of a modified miniature socket embodying one feature of the present invention, but having an ordinary soldering lug.
Fig. 13 is a section taken in the plane of the line 13—13 of Fig. 12.
Fig. 14 is an end elevation of the contact shown in Figs. 12 and 13, drawn to enlarged scale.
Fig. 15 is a side elevation of the same.
Figure 16:
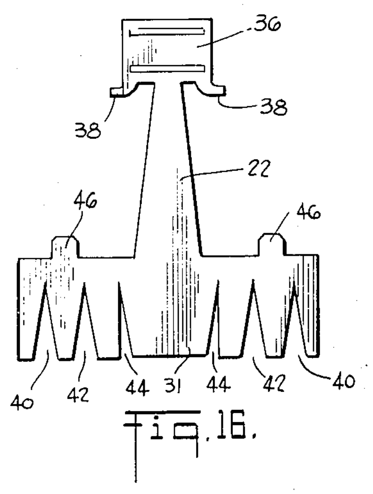
Fig. 16 is a development drawing showing the blank used to make the contact shown in Figs. 1–5.

Referring to Fig. 13, the conventional arrangement heretofore employed a soldering lug 24 bent away from the base portion 26. The lug was bent in the same direction as the pin gripping portion 28, that is, downward with the socket in normal position. The ends of the circuit wires were passed through apertures in the soldering lug and were appropriately bent to secure the same in position, following which the connections were soldered. Each lug was soldered individually.

Reverting now to Figs. 4 and 5, the soldering lug is here replaced by a collateral pair of wire grip portions 30 and 32. These preferably point in opposite direction from the pin gripping portion 18. More specifically, they project upward through upper lamination 12 when the socket is in normal position. It will be understood that during the wiring operation the chassis is inverted, with the socket in the position shown in the drawing. The circuitry is then exposed on top, and the operator merely pushes the bared end of each wire downward through a registering opening 34 in lamination 14, into the wire gripping part 30 or 32. The wire gripping portions are located on a circle concentric with the pin gripping portions, but of substantially larger diameter. The diameter should be greater than that of the lower end or base of the tube, to permit insertion of the tube as far as the socket.

The construction of the metal contact 16 is shown in greater detail in Figs. 1, 2, 3 and 16. Referring to the latter, the contact is made from a metal blank which is generally T-shaped, as there shown. Much of the stem of the T acts later as the base 22 of the contact which is located between the insulation laminations. The free end 36 of the stem is suitably shaped so that it may be folded to form the desired somewhat cylindrical or barrel-shaped pin gripping portion of the contact. This includes a novel form of support tabs or ears 38 which are described later. The crossbar portion of the T-shaped blank is substantial in height, and each branch thereof is incised with a plurality of incisions. In this case each branch has three triangular incisions 40, 42 and 44. There also are tabs or ears 46 for support, as later described. Each branch is folded toward the other to form a collateral pair of wire grip portions, and because of the incisions these wire grip portions may be made to taper from a large opening at one end to a small opening at the other, and are resilient at the small end.

Figures 1, 2:
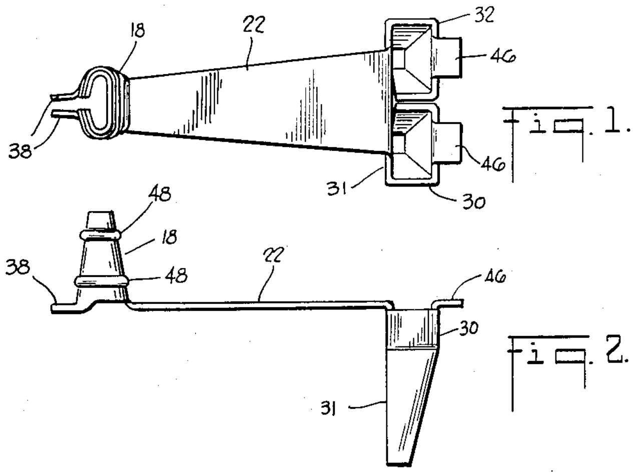
Fig. 1 is a plan view of a metal contact in inverted position.
Fig. 2 is a side elevation of the same.
Figure 3:
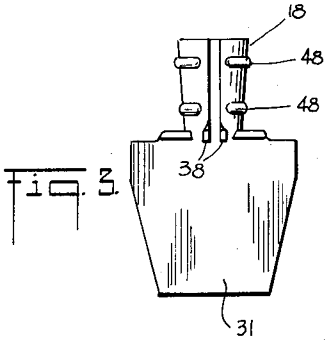
Fig. 3 is an end view of the same.

Figs. 1, 2 and 3 show the contact made from the blank just described. The base portion 22 is flat, and the support tabs 38 and 46 are bent to lie in the plane of the base portion 22, so that in the socket assembly the tabs are supported between the laminations. The wire gripping portions 30 and 32 have large rectangular openings to receive the wire, but taper to small openings at the other end. The two portions are joined by a connecting wall 31. Because of the corner incisions, the sides are free to expand resiliently to grip one or more wires inserted therein.

The pin gripping portion 18 is open at one side so that it too can expand resiliently when a tube pin is inserted therein. The particular part 18 here shown includes annular stiffening ribs 48. The formation and disposition of the support tabs 38 are novel, for these tabs are disposed in vertical planes immediately adjacent one another and opposite the base portion 22, thereby minimizing the possibility of electrical leakage sidewardly between adjacent contacts.

Figure 19:
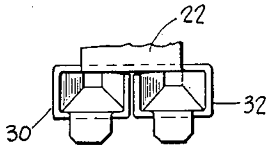
Figs. 19–24 are explanatory of the operation of the wire gripping portions of the disclosed contacts.
Figure 20:
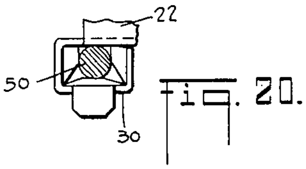
Figure 21:
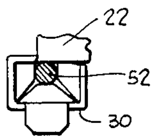
Figure 22:
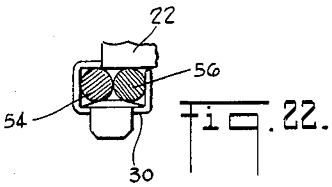
Figure 23:
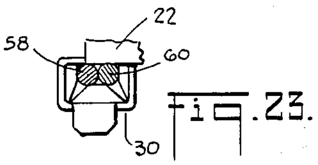
Figure 24:
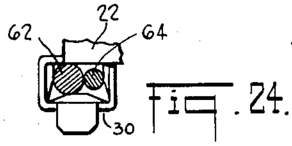

The operation of the wire gripping portions may be described with reference to Figs. 19–24 of the drawing. Fig. 19 shows the wire gripping portions 30 and 32 prior to insertion of a wire therein. Fig. 20 shows how the side walls are spread apart, or how the incisions open up between the side walls, when a single wire 50 of maximum diameter is inserted. Fig. 21 shows how there is some expansion and consequent spring grip on a single wire 52, even if of minimum diameter. Fig. 22 shows how two wires 54 and 56 of maximum diameter may be received and gripped within one of the wire grip portions of the contact. Fig. 23 shows how two wires 58 and 60 of minimum diameter may be received and gripped in one of the wire grip portions of the contact. Fig. 24 shows how two wires, a wire 62 of maximum diameter, and a wire 64 of minimum diameter, may be received and gripped in one of the wire gripping portions of the contact. If it be kept in mind that the contact has two wire gripping portions, as shown at 30 and 32 in Fig. 19, it will be realized that with the present arrangement secure spring gripping connection may be made to each contact by anywhere from one to four wires, ranging over a large range of wire diameter.

Figures 6, 7:
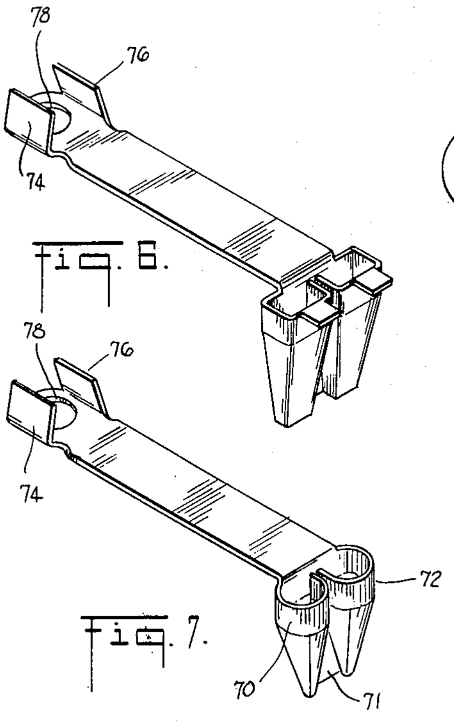
Fig. 6 is a perspective view of a modified metal contact in inverted position.
Fig. 7 is a similar view of a modification.

As so far described, the wire gripping portions have been shown pyramidal in shape, that is, they are rectangular in cross-section and composed of four sides with incisions at the corners. However, it should be understood that they may be made conical rather than pyramidal in shape, and such a variation of the contact is shown at the righthand end of Fig. 7 of the drawing, which is to be contrasted with the righthand end of Fig. 6. More specifically, the wire gripping portions 70 and 72 of Fig. 7 are approximately circular in cross-section, and the tapered ends are conical rather than pyramidal. The portions are joined by a connecting wall 71. Here again, however, the tapered wall has a plurality of incisions to permit outward flexing or expansion of the small ends, and to provide the desired spring grip on the inserted wires. I prefer to employ the pyramidal rather than conical form of the invention, but am influenced in this by the fact that the pyramidal form is somewhat easier to design, develop and form in a high speed progressive die.

It will be recalled that the radio tube pin gripping portion 18 of the contact in Figs. 1–5 was on the barrel type. However, it may also be of the edge grip type, and such contacts are shown in Figs. 6 and 7 of the drawing, in which it will be seen that the pin gripping portion consists of sides 74 and 76 which are bent toward one another and disposed in alignment with a pin receiving hole 78. The tube pin is inserted in the direction from the hole past the edges of the parts 74 and 76, and the latter tend to bite into the sides of the pin and to effectively contact and hold the same. Such a pin gripping portion is simple to form, the blank for the contact of Fig. 6 being shown in Fig. 17. The blank is generally T-shaped, with a base portion 80 and a wide cross-bar 82, the latter having a plurality of triangular incisions the same as in Fig. 16. The free end of the stem portion 80 has parts 74 and 76 on each side of a pin receiving aperture 78, and when these parts 74 and 76 are folded toward one another they form the pin gripping portion of the contact.

Figure 17:
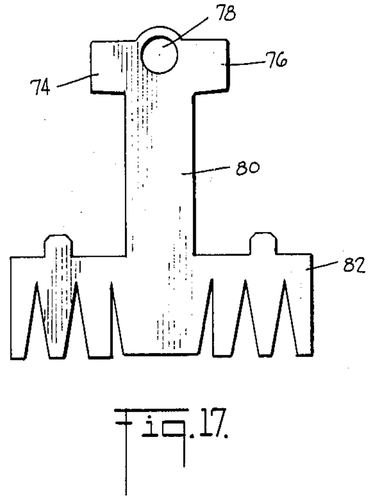
Fig. 17 is a development drawing showing the blank used to make the contact shown in Figs. 6, 8 and 9.

A socket embodying the contact of Figs. 6 and 17 is shown in Figs. 8 and 9 of the drawing. Here again the socket is inverted, and comprises upper and lower laminations 84 and 86 held together by a center shield and eyelet 88. The contacts are disposed radially in a ring with the base portions 80 held between the laminations 84 and 86. The pin gripping parts 74 and 76 are located on a circle of small diameter, and in registration with pin receiving holes 90 in the upper lamination 84. The wire gripping portions 92 are pointed in opposite direction and pass through the upper lamination 84 and are in registration with mating openings 94 in the lower lamination 86. The wire gripping portions are located on a circle concentric with the circle of pin gripping portions, but the outer circle is substantially greater in diameter, it being understood that the latter diameter must be greater than the diameter of the lower end of the tube, for when the tube is inserted in the socket the base of the tube comes all the way to the socket, and within the circle of wire gripping portions. Here again it will be understood that the socket is shown in the inverted position which it assumes during the wiring operation, for the wires are inserted from above and are soldered from below.

Figs. 10 and 11 are generally similar to Figs. 8 and 9, but show a slight variation in which the wire gripping portions 70 and 72 are conical rather than pyramidal in shape. In other words, the socket of Figs. 10 and 11 is similar to the socket of Figs. 8 and 9, except that it employs the metal contact of Fig. 7 instead of the metal contact of Fig. 6. Here again the contacts are preferably disposed radially, with the gripping portions on concentric circles. The diameter of both circles is determined by the tube design, for the inner circle must correspond to the ring of pins projecting from the base of the tube, and the outer circle must come outside the base of the tube.

Figure 18:
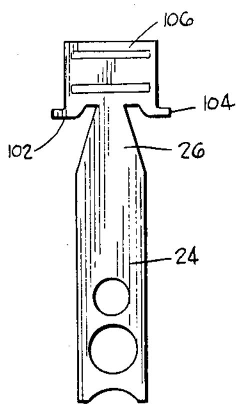
Fig. 18 is a development drawing showing the blank used in making the contact shown in Figs. 12–15.

In connection with Figs. 1–3 it was pointed out that the support tabs 38 are of novel character and have the advantage of not reducing the spacing between adjacent contacts, or of not increasing the danger of electrical leakage. This feature is shown in Figs. 12–15 combined with a soldering lug. The soldering lug 24 is simply an extension of the base portion 26, and is bent to pass through the lower lamination 100. In Fig. 14 it will be seen that the tabs 102 and 104 lie in adjacent vertical planes and are disposed diametrically opposite the base 26. The development of this contact is shown in Fig. 18, and it will there be seen that the support tabs 102 and 104 are stamped to shape in the plane of the sheet material. When the area 106 is folded to form the barrel portion 28, and the latter is bent so that its axis is in perpendicular relation to the base portion 26, the support tabs 102 and 104 come into the desired position.

Figures 25, 26, 27, 28, 29, 30, 31, 32, 33, 34:
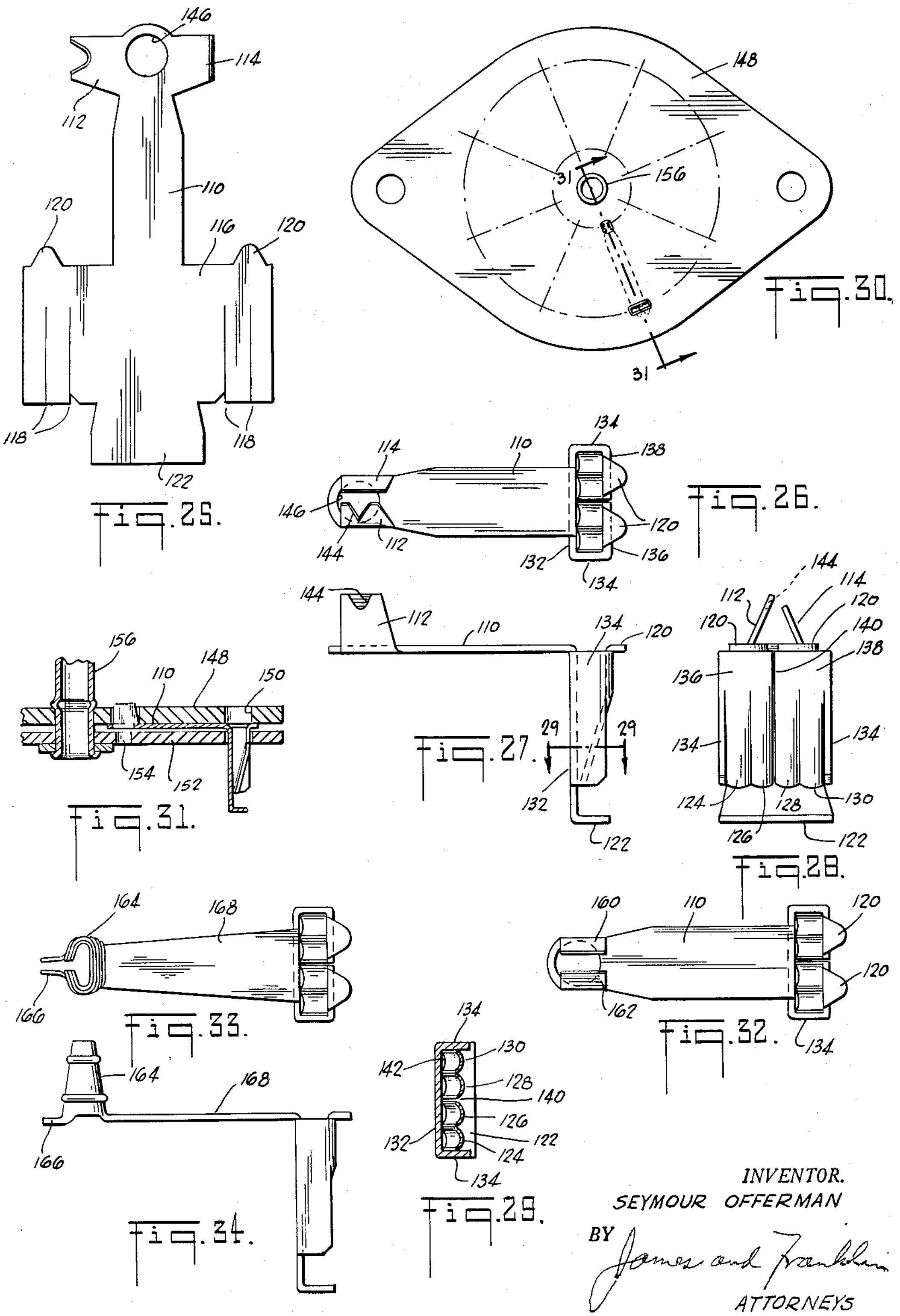
Fig. 25 is a development drawing showing a blank used to make a contact shown in Figs. 26–29 of the drawing.
Fig. 26 is a plan view of the contact in inverted position.
Fig. 27 is a side elevation of the same.
Fig. 28 is an end view of the same.
Fig. 29 is a section taken substantially in the plane of the line 29—29 of Fig. 27.
Fig. 30 is a plan view of an inverted socket utilizing the contact of Figs. 26–29.
Fig. 31 is a section taken in the plane of the line 31—31 of Fig. 30.
Fig. 32 is a view similar to Fig. 26 but showing a slight modification of the contact at the tube pin gripping portion.
Fig. 33 is a view similar to Fig. 26 but showing the use of a tube pin gripping portion of the barrel type, similar to that shown in Figs. 1–3.
Fig. 34 is a side elevation of the contact shown in Fig. 33.

Referring now to Fig. 25, the blank there shown is generally T-shaped. Much of the stem portion 110 acts as a base adapted to lie along or to be received between the insulation laminations of a laminated socket. The free end is shaped at 112 and 114 to form a pin grip portion. A cross-bar 116 of the blank is substantial in height, and each branch thereof is incised with a plurality of incisions 118. The cross-bar is also provided with support tabs 120, and in the present case has a projection 122 which serves later to form a wire stop ledge described later.

In Figs. 26–29 the blank is shown bent up to form the desired contact. It will be seen that the branches of the T-shaped blank have been folded toward one another to form four collateral wire grip portions best shown at 124, 126, 128 and 130 in Fig. 28. More specifically, there is a back wall 132 which has no incisions and which is relatively rigid. Bent outwardly from back wall 132 are two edge walls 134. Turned inwardly toward one another from the edge walls are the two outer walls indicated at 136 and 138 in Fig. 28. These come into substantially edge-to-edge relation as shown at 140. The incisions 118 (Fig. 25) serve to free most of the length of the collateral fingers or wire grip portions 124—130. Each wire grip portion is preferably made outwardly convex or somewhat trough-shaped in section, as is best shown in Fig. 29. The support tabs 120 are bent outwardly in the plane of the main stem portion 110 (Fig. 27).

It will be evident that with this construction any numbers of wires from one to four may be inserted at the large end of the wire grip portion, and upon insertion will be gripped at the lower or resilient ends of the fingers. Each finger has its own wire grip portion, and a wire will be successfully gripped and held over a large range in diameter. Thus in Fig. 29 the convexity shown at 142 is kept small enough to grip the smallest diameter wire employed in wiring the chassis. A larger diameter wire simply bends the spring finger outward. The width of the spring fingers is minimized relative to the maximum diameter wire used in wiring the chassis. This is desirable in order to limit the overall width of the wire receiving portion, and it is also desirable in order that when successive wires are inserted into the wire grip portion they will distribute themselves among the different wire gripping fingers.

At the same time escape of any of the wires sidewardly from the wire grip portion is effectively prevented by the edge walls 134 which are not resilient and which are disposed outside the end fingers 124 and 130, as is best shown in Figs. 28 and 29.

This arrangement with its four resilient fingers has some advantage over that previously described with two wire grip portions each intended to receive two wires. With the latter arrangement an exceedingly careless operator might mistakenly attempt to insert three or four wires into one of the wire grip portions, instead of inserting only two in each of the wire grip portions. With the present arrangement here shown in Figs. 26–29 the operator may insert the wires carelessly, but they will distribute themselves side-by-side, and be separately gripped by the four different portions or by a corresponding number of resilient fingers.

The projection 122 shown on the blank in Fig. 25 is bent to form a wire stop ledge indicated at 122 in Figs. 27, 28 and 29. This limits the insertion of the wires to be soldered. The operator simply presses each wire into the wire grip portion as far as it will go, and the wire comes to a stop when its end hits the stop ledge 122. This eliminates the need for subsequently trimming excess length of wire.

Referring now to the pin grip portion of the contact, it will be seen that in the present case the side 112 is longer than the side 114 (Fig. 28) instead of both being equal. The side 112 is provided with a large generally triangular notch 144. The notch is so dimensioned that when a spring pin is received in the pin grip portion it will be engaged at three points, one on each side of the notch 144, and the other at the free edge of the side 114. The sides are appropriately dimensioned relative to the location of the hole 146 to grip the pin while it is in alignment with the hole through which it passes.

It will be noted also that the sides 112 and 114 are trapezoidal rather than rectangular. In other words, they converge or taper in width from the inner or base end toward the outer or free end. This provides a better resilient action than would be the case with rectangular sides, for it is desirable to have greater flexibility toward the ends than at the base inasmuch as the sides act in cantilever.

It will be understood that the contact may be assembled between the laminations of a laminated socket in the conventional fashion previously described, and this is illustrated in Figs. 30 and 31 of the drawing. The bottom lamination 148 is provided with a ring of holes to receive the pin gripping portions and another ring of holes at much larger radius for registration with the wire grip portions. These holes are shown at 150 in Fig. 31. The upper lamination 152 is provided with a ring of holes at large radius to receive the wire grip portions and another ring of holes 154 at small radius to receive the tube pins. The stem or base portions 110 are received between the laminations 148 and 152. The radius of the ring of outer holes is larger than the diameter of the tube to be received by the socket so that the wire grip portions will not interfere with reception of the tube, it being understood that in Fig. 31 the tube would be inserted from below, the socket being shown in inverted or solder-dipping position instead of in upright or tube receiving position. In the particular socket here shown the laminations 148 and 152 are held together by a center shield 156. It will also be understood that while only one contact is shown in Fig. 30, in practice there are seven contacts distributed at a separation of 45°, the eighth space being left blank to insure proper orientation of the tube when it is being inserted.

It will be understood that the improved wire grip portion with four separate resilient fingers disposed in collateral relation may be used with varying forms of tube pin grip portion. Thus Fig. 32 shows a contact similar to that of Fig. 26, but the tube pin grip portion is of the pinch type with equal or symmetrical rectangular sides 160 and 162. In other words, the pin grip portion is the same as that shown in Figs. 6 and 7.

Figs. 33 and 34 show the same wire grip portion applied to a contact in which the pin grip portion is of the barrel type. The barrel 164 is preferably tapered and annularly stiffened as described in connection with Figs. 1, 2 and 3. It may similarly be provided with support tabs 166 which are disposed in vertical planes immediately adjacent one another opposite the base portion 168 in order to minimize the possibility of electrical leakage between adjacent contacts, all as was previously described. The tabs 166 are, of course, received between the insulation laminations.

It is believed that the construction, method of manufacture, and method of use of my improved tube socket, as well as the advantages thereof, will be apparent from the foregoing detailed description.

The chassis is provided with holes at the intended location of the sockets. These holes are made large enough in diameter to clear the wire gripping portions, with no electrical leakage. The sockets are riveted to the chassis.

When the chassis has been partially wired, except for the connections to the sockets, the chassis passes in inverted position before one or more operators who simply push the bared ends of the wires into the appropriate wire gripping portions of the contacts. The lower side of the inverted chassis is clear, except for the wire gripping portions and the wire ends. The chassis is dipped successively into flux and into molten solder while holding the chassis horizontal, the immersion being small enough to wet only the ends of the wires and the wire gripping portions without reaching the chassis itself. Thus in one brief instant, and preferably by means of a mechanical conveyor, all of the many connections to all of the sockets are simultaneously soldered. Wire ends of excessive length, if any, may be trimmed after the soldering operation. This is not necessary when using a wire stop ledge as in Figs. 26–34 of the drawing.

It will also be apparent that while I have shown and described my invention in several preferred forms, changes may be made in the structures disclosed, without departing from the scope of the invention as sought to be defined in the following claims. The species in which two wire grip portions are employed, each designed to receive two wires, are not claimed herein, they being claimed in my companion application, Serial No. 257,015, filed November 19, 1951, of which the present application is a continuation-in-part.

I claim:

1. A metal contact for a tube socket or the like, said contact being formed out of a single integral generally T-shaped blank of sheet metal, much of the stem portion of said blank acting as a base adapted to be received between the insulation laminations of a laminated socket, a pin grip portion formed at one end of said base portion pointing in one direction, the crossbar portion of said T-shaped blank being substantial in height, and each branch thereof being incised with two parallel incisions to form two collateral spring fingers, said branches being folded transversely to form a back wall and edge walls and being folded toward one another, whereby the four spring fingers form four resilient wire grip portions cooperating with the back wall and pointing in a direction opposite to the pin grip portion, each of said wire grip portions being dimensioned to receive and grip a single wire over a substantial range of diameter.

2. A metal contact for a socket for miniature radio tubes, said contact having a flat base portion adapted to extend along the insulation of a laminated radio tube socket, means at one end of said contact base for a soldered connection, and a tube pin gripping portion at the other end of said contact base, said pin gripping portion being of the pinch type and having two side walls bent downwardly on opposite sides of the contact base at a hole in the contact base, one side wall being longer than the other and having a triangular notch at its free end, the other and shorter wall having a straight edge at its free end, whereby a tube pin inserted in said pin gripping portion is gripped at three points.

3. A metal contact for a socket for miniature radio tubes, said contact having a flat base portion adapted to extend along the insulation of a laminated radio tube socket, means at one end of said contact base for a soldered connection, and a tube pin gripping portion at the other end of said contact base, said pin gripping portion being of the pinch type and having two side walls bent downwardly on opposite sides of the contact base at a hole in the contact base, one side wall being longer than the other and having a triangular notch at its free end, the other and shorter wall having a straight edge at its free end, and both being trapezoidal in shape with the free end smaller than the base end, whereby a tube pin inserted in said pin gripping portion is gripped at three points.

4. A laminated socket for radio tubes or the like, said socket comprising upper and lower insulation laminations secured together with a ring of metal contacts therebetween, each of said contacts being formed out of a single integral generally T-shaped blank of sheet metal, much of the stem portion of said blank acting as a base received between the laminations and disposed in radial direction, a pin grip portion formed at the inner end of each base portion pointing downwardly and passing through a lower lamination, the crossbar portion of said T-shaped blank being substantial in height, and each branch thereof being incised with two parallel incisions to form two collateral spring fingers, said branches being folded transversely to form a back wall and edge walls and being folded toward one another, whereby the spring fingers form four resilient wire grip portions cooperating with the back wall and pointing in a direction opposite to the pin grip portion, each of said wire grip portions being dimensioned to receive and grip a single wire over a substantial range of diameter, the pin grip portions being disposed on a circle, and the wire grip portions being disposed on a concentric circle of larger diameter.

5. A socket for miniature radio tubes, said socket comprising insulation and a ring of metal contacts thereon each having at one end means for a soldered connection and a pin gripping portion at the other end, said pin gripping portion being of the pinch type and having two side walls bent downwardly on opposite sides of the base at a hole in the base, one side wall being longer than the other and having a triangular notch at its free end, the other having a straight edge at its free end, whereby a tube pin inserted in said pin gripping portion is gripped at three points.

6. A laminated socket for miniature radio tubes, said socket comprising insulation laminations with a ring of metal contacts each having a flat base portion secured between said laminations, means at the outer end of each contact base portion for a soldered connection, and a pin gripping portion at the inner end of each contact base portion, said pin gripping portion being of the pinch type and having two side walls bent downwardly on opposite sides of the contact base at a hole in the contact base, one side wall being longer than the other and having a triangular notch at its free end, the other having a straight edge at its free end, and both being trapezoidal in shape with the free end smaller than the base end, whereby a tube pin inserted in said pin gripping portion is gripped at three points.

7. A socket for radio tubes or the like, said socket being designed to be pot soldered and comprising insulation and a ring of metal contacts thereon, each of said contacts being formed out of a single integral blank of sheet metal having a base portion supported by said insulation and a pin grip portion pointing downwardly from said base portion and having a wire grip portion including a back wall and three or more collateral resilient wire grip fingers pointing upwardly from said base portion in a direction opposite to the pin grip portion, each wire grip finger and the back wall being relatively convergent in a direction from the insulation end toward the free end, each wire grip finger being movable toward and away from the back wall independently of the other wire grip fingers, and each of said wire grip fingers being dimensioned to receive and grip between it and the back wall a single wire over a substantial range of diameter.

8. A metal contact for a tube socket or the like intended to be pot soldered, said contact being formed out of a single integral blank of sheet metal having a base portion, one end of said contact being shaped and bent to form a pin grip portion at one end of said base portion pointing in one direction approximately perpendicular to the base portion, the other end of said contact having a back wall and three or more collateral resilient wire grip portions pointing in a direction approximately perpendicular to the base portion and opposite to the pin grip portion, each wire grip portion and the back wall being relatively convergent in a direction from the base end toward the free end, each wire grip portion being movable toward and away from the back wall independently of the other wire grip portions, and each of said wire grip portions being dimensioned to receive and grip between it and the back wall a single wire over a substantial range of diameter.

9. A laminated socket for radio tubes or the like, said socket being designed to be pot soldered and comprising upper and lower insulation laminations secured together with a ring of metal contacts therebetween, each of said contacts being formed out of a single integral generally T-shaped blank of sheet metal, much of the stem portion of said blank acting as a base received between the laminations and disposed in radial direction, a pin grip portion formed at the inner end of each base portion pointing downwardly and passing through a lower lamination, the crossbar portion of said T-shaped blank being substantial in height, and each branch thereof being incised with a plurality of collateral incisions to form collateral spring fingers, said branches being folded transversely to form a back wall and being folded toward one another to form with the back wall three or more resilient wire grip portions pointing upwardly in a direction opposite to the pin grip portion, each wire grip finger and the back wall being relatively convergent in a direction from the insulation end toward the free end, each wire grip finger being movable toward and away from the back wall independently of the other wire grip fingers, and each of said wire grip portions being dimensioned to receive and grip a single wire over a substantial range of diameter.

10. A metal contact for a tube socket or the like intended to be pot soldered, said contact being formed out of a single integral generally T-shaped blank of sheet metal, much of the stem portion of said blank acting as a base adapted to extend along the insulation of a socket, a pin grip portion formed at one end of said base portion pointing in one direction approximately perpendicular to the base portion, the crossbar portion of said T-shaped blank being substantial in height, and each branch thereof being incised with a plurality of collateral incision to form collateral spring fingers, said branches being folded transversely to form a back wall and being folded toward one another to form with the back wall three or more resilient wire grip portions pointing in a direction approximately perpendicular to the base portion and opposite to the pin grip portion, each wire grip portion and the back wall being relatively convergent in a direction from the base end toward the free end, each wire grip portion being movable toward and away from the back wall independently of the other wire grip portions, and each of said wire grip portions being dimensioned to receive and grip a single wire over a substantial range of diameter.

11. A socket for radio tubes or the like, said socket being designed to be pot soldered and comprising insulation and a ring of metal contacts thereon, each of said contacts being formed out of a single integral blank of sheet metal having a base portion supported by said insulation and a pin grip portion pointing downwardly from said base portion and having a wire grip portion including a back wall and three or more collateral resilient wire grip fingers pointing upwardly from said base portion in a direction opposite to the pin grip portion, each wire grip finger and the back wall being relatively convergent in a direction from the insulation end toward the free end, each wire grip finger being movable toward and away from the back wall independently of the other wire grip fingers, each of said wire grip fingers being dimensioned to receive and grip between it and the back wall a single wire over a substantial range of diameter, and the free edge of said back wall remote from said base portion being bent transversely to form a wire stop flange located in alignment with and spaced from the ends of the wire grip portions.

12. A metal contact for a tube socket or the like intended to be pot soldered, said contact being formed out of a single integral blank of sheet metal having a base portion, one end of said contact being shaped and bent to form a pin grip portion at one end of said base portion pointing in one direction approximately perpendicular to the base portion, the other end of said contact having a back wall and three or more collateral resilient wire grip portions pointing in a direction approximately perpendicular to the base portion and opposite to the pin grip portion, each wire grip portion and the back wall being relatively convergent in a direction from the base end toward the free end, each wire grip portion being movable toward and away from the back wall independently of the other wire grip portions, each of said wire grip portions being dimensioned to receive and grip between it and the back wall a single wire over a substantial range of diameter, and the free edge of said back wall remote from said base portion being bent transversely to form a wire stop flange located in alignment with and spaced from the ends of the wire grip portions.

References Cited in the file of this patent

UNITED STATES PATENTS

| | | |
|---|---|---|
| 1,642,684 | Manson | Sept. 20, 1927 |
| 1,774,646 | Goudy | Jan. 5, 1937 |
| 2,066,876 | Carpenter | Jan. 5, 1937 |
| 2,158,004 | Douglas | May 9, 1939 |
| 2,454,760 | Anderson | Nov. 30, 1948 |
| 2,486,115 | Chiuchiolo | Oct. 25, 1949 |
| 2,492,235 | Mitchell | Dec. 27, 1949 |
| 2,503,559 | Miloche | Apr. 11, 1950 |
| 2,593,479 | Nieter | Apr. 22, 1952 |

FOREIGN PATENTS

| | | |
|---|---|---|
| 698,029 | Great Britain | Oct. 7, 1953 |